May 8, 1934.  W. B. FLYNN  1,957,532
ROTARY WELL DRILLING BIT
Filed Aug. 17, 1931  2 Sheets-Sheet 1
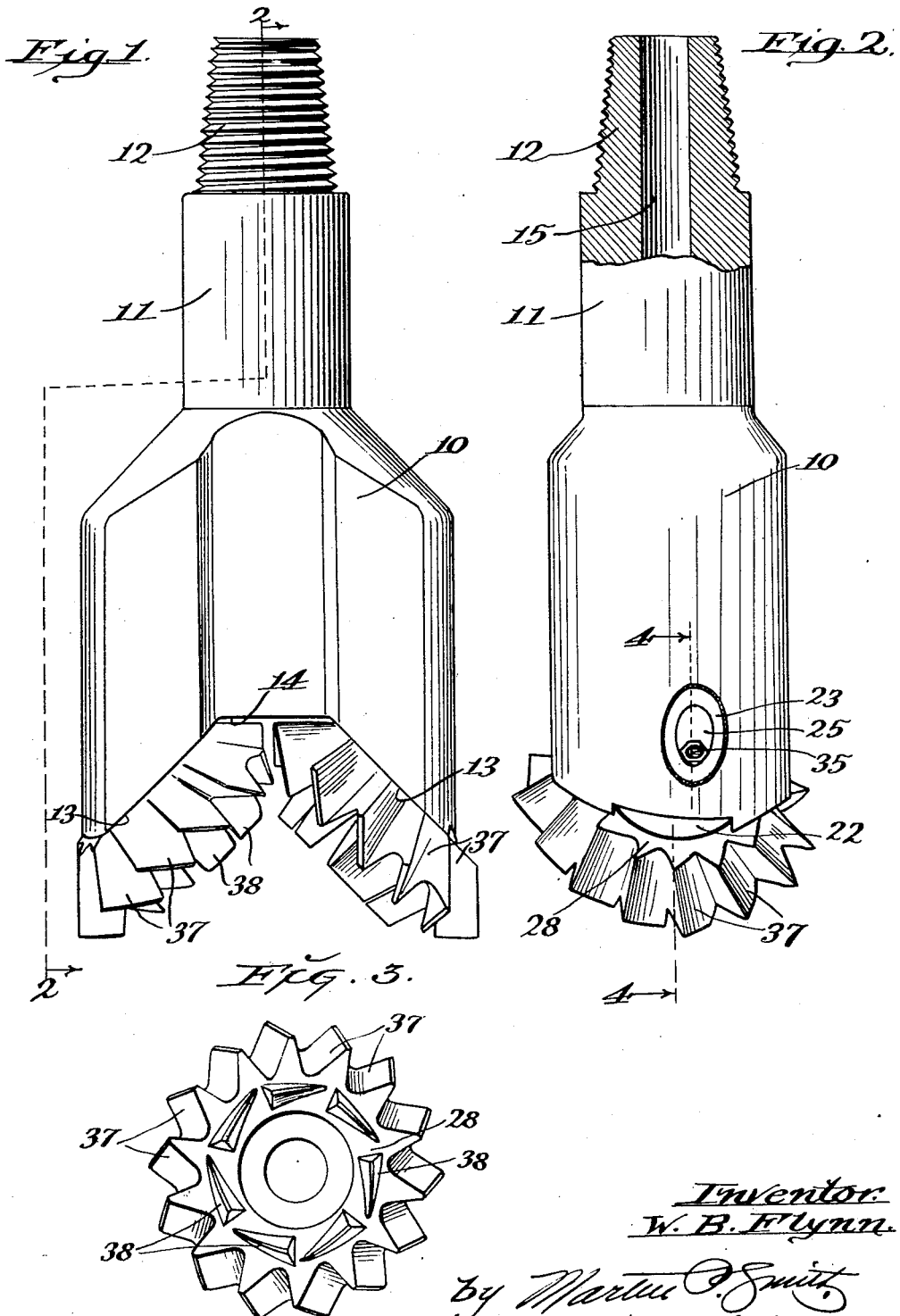

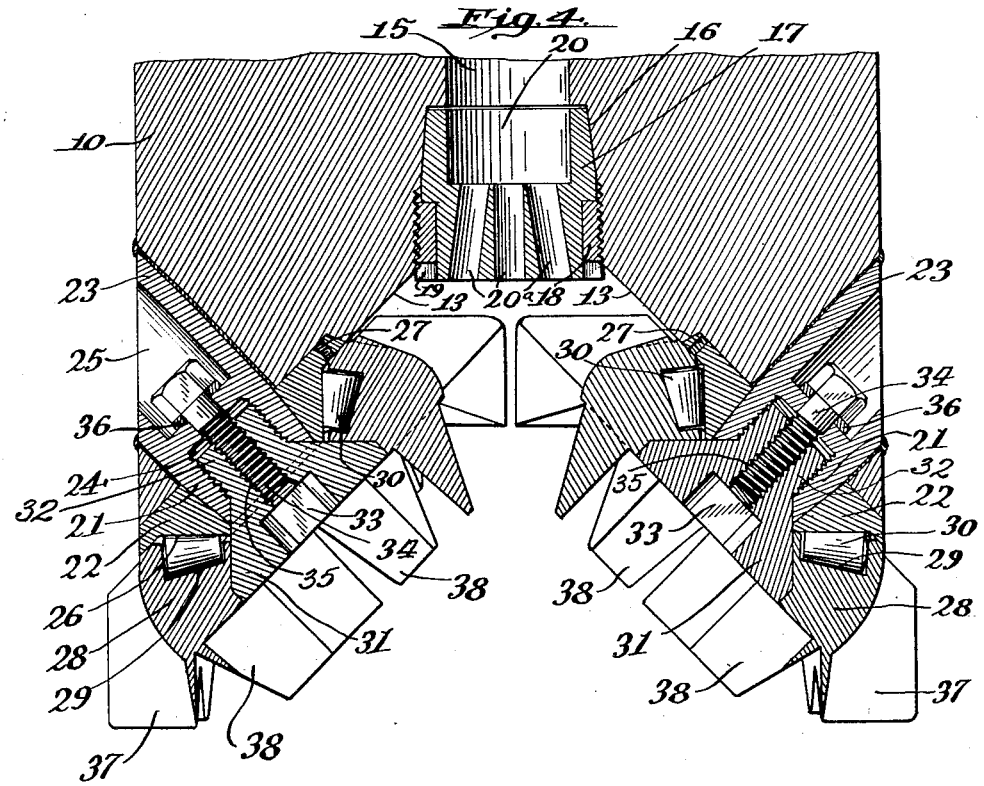
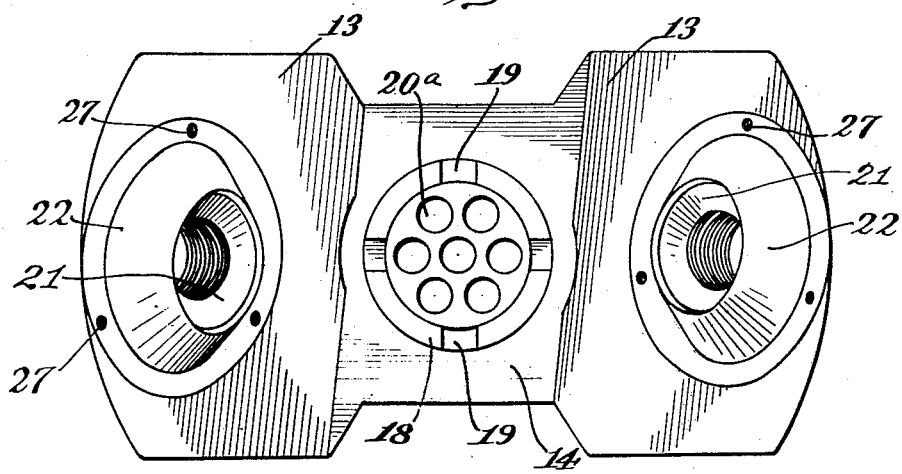

Patented May 8, 1934

1,957,532

UNITED STATES PATENT OFFICE 1,957,532

ROTARY WELL DRILLING BIT

William B. Flynn, Ventura, Calif.

Application August 17, 1931, Serial No. 557,582

10 Claims. (Cl. 255—71)

My invention relates to a rotary drilling bit, particularly of the type wherein a pair of rotary toothed cutters are mounted for operation at the lower end of a bit body or shank, which types of bits are generally used for the drilling of deep wells and exploration holes and the principal objects of my invention are, to generally improve upon and simplify the construction of the existing forms of rotary drilling bits and to provide a rotary drill that is of strong, rugged construction so as to readily withstand the strains and stresses that are developed while the drill is in operation as well as the strains developed by the weight of relatively long strings of drilling tubes to which the drill is connected and further, to provide novel means for mounting the toothed cutters upon the drill body so that they will operate to greatest advantage during drilling operations and said rotary cutters having a maximum area of antifriction bearing surfaces.

Further objects of my invention are, to provide a rotary drill that will operate to greatest advantage in both hard and soft formations, to provide a drill having rotary cutters that are equipped with teeth having a large number of cutting edges and which teeth are especially designed so that they will have a prying or gouging effect as they enter and pass through the formation and further, to provide a drill that will ream the hole out to the full gauge during the drilling operation.

Further objects of my invention are, to provide a drill which, by virture of its construction, will drill a relatively straight hole and will not tend to stick in certain formations and thereby develop an expensive and troublesome fishing job, further, to provide for the ready circulation of fluid through the drill to carry off the cuttings from the rotary bits and further, to construct the drill so that it may be readily assembled or taken apart, thereby facilitating inspection, repairs and replacement of parts which have become unserviceable as a result of excessive wear or breakage.

With the foregoing and other objects in view, my invention consists in certain novel features of construction and arrangement of parts that will hereinafter be more fully described and claimed and illustrated in the accompanying drawings in which:

Fig. 1 is an elevational view of a rotary drill embodying the principles of my invention.

Fig. 2 is a view partly in elevation and partly in section and taken on the line 2—2 of Fig. 1.

Fig. 3 is a view looking against the underface of one of the rotary toothed cutters.

Fig. 4 is an enlarged vertical section taken on the line 4—4 of Fig. 2.

Fig. 5 is an elevational view looking against the underface of the drill body or shank and with the rotary cutters removed therefrom.

Referring by numerals to the accompanying drawings, 10 designates the main body of the bit which may be cast or forged from suitable metal and projecting upwardly from said body is a short shank 11 and the upper portion of said shank is externally threaded as designated by 12 in order to be connected in the conventional manner by means of a sub or coupling member to the lower end of a drill string.

The underside of the drill body 10 is notched or cut away to form a substantially triangular space or chamber having a pair of oppositely arranged inclined faces 13 that occupy planes of approximately forty-five degrees relative to vertical and horizontal planes and the intermediate face 14, between the inclined faces 13, is disposed at right angles to the axis of the bit.

Formed axially through the body 10 and shank 11, is a bore 15, that functions as a circulation duct, and the lower end of this duct communicates with a circular chamber 16 that is formed immediately above the intermediate surface 14 and the lower portion of which chamber is internally threaded.

Removably seated in the chamber 16 is a block 17, the lower portion of which is reduced in diameter for the reception of a retaining ring or locknut 18, that is screwed into the threaded lower portion of the chamber 16, thereby firmly retaining the block or bushing 17 in said chamber.

The underface of the locknut or ring 18 is provided with notches 19 for the reception of a spanner wrench or like tool.

Formed in the upper portion of the block or bushing 17 is a recess 20, that communicates directly with the lower end of the circulation duct 15 and leading from this recess downwardly to the underface of the block or bushing is a plurality of passages 20ª, which diverge downwardly. As a result of this arrangement, the circulation fluid is discharged from the lower end of the drill in diverging jets directly against the inner high portions of the rotary bits that are mounted for operation in the notch or chamber in the underface of the bit of the drill body.

The width of the body 10 is somewhat greater than its thickness and the inclined faces 13 on the underside of the body are formed so that they occupy angular planes that are several degrees offset with respect to planes that are disposed at right angles to each other and which intersect the axis of the body 10 and shank 11. Thus the inclined faces 13 occupy the slightly canted positions as illustrated in Fig. 5 and the flat intermediate face 14 occupies a corresponding canted position. As a result of this formation of the inclined faces 13, the toothed cutters that are mounted for rotation immediately below the inclined faces occupy corresponding canted or tilted positions.

This arrangement of the cutters, I have demonstrated in practice, materially increases the effectiveness of the rotary drill.

Projecting at right angles from each inclined face 13, is a stud 21 that tapers slightly toward its outer end and said stud serves as a base or bearing for a thrust ring or bushing 22. These studs 21 may be formed integral with the body 10 of the drill or as illustrated in Fig. 4 they may be a part of plugs 23 of hardened metal that are positioned in inclined openings in the body 10 and rigidly connected thereto in any suitable manner, preferably by welding.

Each stud is provided with an axially disposed threaded recess 24 and formed in the upper portion of each block 23 or in the body 10 in axial alignment with the recess 24, is a recess 25.

Thrust bushing 22 is provided on its underface with an inclined bearing surface 26 that is disposed at an angle of approximately forty-five degrees relative to the axis of said bushing and formed through the outer portion of said bushing adjacent to its edge are small threaded apertures 27 that are adapted to receive screws that are utilized for removing the thrust bushing from its supporting stud 21.

It will be understood that the bushings fit snugly upon the studs and when it is desired to remove said bushings, screws are inserted in the threaded apertures 27 and the inner ends of these screws bearing against the inclined faces 13 of the body 10, force the bushings outwardly away from said inclined faces and off the studs 21.

Mounted to rotate freely on each thrust bushing, is the disc-shaped body 28, of a toothed cutter and formed in the upper face of said body is a circular channel 29 that functions as a race for suitable anti-friction members, preferably roller bearings 30 that bear directly upon the inclined bearing surface 26 of the bushing 22.

The rotary cutter 28 is retained on the thrust bushing 22 by the substantially conical head 31 of a locking or retaining pin, which head occupies a corresponding opening in the center of the rotary cutter and the shank 32 of said retaining pin being threaded so as to engage in the threaded recess 24 in stud 21.

Formed in the underside of the head 31 of the retaining pin, is a noncircular recess 33, for the reception of a wrench or tool that is used when the pin is screwed into or out of the stud 21.

In order to lock the cutter retaining pin to the stud 21, a bolt 34 is screwed into an axial threaded bore 35 that is formed in the retaining pin 32 and the head of this bolt, which is locked in the recess 25, is engaged by a lock washer 36.

In order to more effectively secure the retaining pin to the stud, the thread on the shank 32 and the thread of recess 24 may be righthand threads and the thread on the shank of bolt 34 may be a lefthand thread.

Formed integral with the outer edge of each rotary cutter body 28 is a series of outside cutting teeth 37 that are substantially wedge-shape in vertical section and the outer and lower edges of these teeth are disposed substantially at right angles to each other. These teeth are formed so that their upper portions project slightly beyond the outer peripheral portion of the body 28 and thus when the drill body is in proper vertical position for operation, the outer edges of the lowermost teeth 37 on the rotary cutters occupy substantially vertical planes parallel with the axis of the drill, but in planes slightly beyond the side faces of the main body 10 and thus the extended or outwardly projecting outer edges of the teeth function as reaming edges to cut through the formation in a circle that is slightly larger than the circumference of the drill body. When the drill body occupies a normal vertical position, the lower edges of the lowermost teeth on the rotary cutters occupy substantially horizontal positions at right angles to the axis of the drill.

Owing to the fact that the rotary cutters occupy oppositely disposed angular positions of approximately 45° relative to vertical and horizontal planes, the upper edges of the teeth at the tops of the rotary cutters occupy a horizontal plane just below the lower ends of the diverging circulation fluid outlet openings 20$^a$ and the outer edges of said upper teeth occupy vertical positions immediately adjacent to each other and adjacent to the axial line of the drill, as illustrated in Fig. 4.

The lower or outer portions of the outside cutting teeth 37, instead of being radially disposed with respect to the axes of the cutters are slightly inclined so that they occupy planes that are tangential to the circumferences of the cutter bodies. This particular arrangement of the teeth is illustrated in Fig. 3.

Formed integral with and projecting from the underface of the body 29 of each rotary cutter and concentric with the row of outside cutting teeth 37, is a circular row of inside shearing teeth 38 that project outwardly in planes approximately 45° with respect to the longitudinal planes of the teeth 37 and these shearing teeth are substantially wedge-shape in cross section with inner faces that are substantially parallel with the axes of the cutters and the outer faces being inclined lengthwise approximately 30° from the straight inner faces of said teeth and said outer faces being formed convex in horizontal section. These inside shearing teeth are tangentially disposed with respect to a circle of rotation of the bodies of the rotary cutters and when the cutters are properly positioned on the lower end of the drill body and the latter is in its normal vertical position, the two sets of shearing teeth occupy angular positions of approximately 90° and they project from the undersurfaces of the cutting discs inwardly and downwardly, as illustrated in Fig. 4.

During operation of my improved drill the body 10, at the lower end of the drill string, is rotated in the hole in the usual manner generally toward the right and after the drill is thus rotated, the outer vertical faces of the lowermost teeth on the two rotary cutters engage the formation at the sides of the hole, the lower edges of said teeth 37 engage the formation at the bottom of the hole and at the same time the inside shearing teeth 38 engage the formation directly beneath the drill body and between those portions of the formation that are engaged by the outer and lower edges of the outside cutting teeth 37.

As a result of this engagement between the teeth of the rotary cutters and the formation, said cutters are caused to rotate on their axes in a reverse direction to that in which the drill body is rotated. This reverse rotation of the cutters and the engagement of their teeth with the formation causes the teeth to cut and gouge the formation loose and the cuttings are carried off by the circulation fluid that is pumped under pressure downwardly through duct 15 and which fluid discharges from the diverging openings 20ᵃ directly unto the upper portions of the cutters.

As a result of the angular arrangement of the rotary cutters, the formation at the bottom of the hole and directly beneath and between the cutters assumes a substantially conical shape, the apex of which is directly between the two sets of inside shearing teeth 38 and directly in vertical alignment with the axis of the drill.

As heretofore described the rotary cutters occupy positions that are slightly canted with respect to a plane that passes through the axis of the drill body and through the greatest width thereof and this slight canting or inclination of the cutters is effective in increasing their efficiency and cutting action while in operation, for both sets of teeth operate with a shearing action upon the formation immediately below the drill.

The cone produced in the formation between the rotary cutters naturally tends to prevent said cutters form rotating toward the lefthand and during rotation of the drill toward the righthand and the cutters have been designed so that they will always turn in spite of the tendency of the cone to prevent them from so rotating.

The construction of the cutters and the mounting of the same are such that the torque that tends to turn the cutter wheels toward the lefthand during operation, will far exceed that caused by the upper portion of the formation cone, which tends to prevent this rotation. In other words the torque tending to turn the cutting discs in a direction opposite to that in which the drill is rotating, overbalances the braking tendency of the formation cone due to the fact that the outer vertical edges of the teeth 37 and their horizontal lower edges make direct contact respectively with the formation at the sides and bottom of the hole that is being drilled and further, for the reason that the outer portions of the teeth 37 encounter the greatest leverage resistance, due to the fact that they are operating in the formation around the greatest circumference of the hole that is being drilled.

During rotation of the cutting discs, the outer sets of teeth 37 and the inner sets of shearing or gouging teeth 38 completely cover the bottom of the hole so that the latter is drilled to proper gauge and the constant formation of the central cone between the rotary cutters eliminates the possibility of the drill from creeping or moving laterally during operation and thereby causes the bit to bore a straight hole.

The angularity of the bushings 22 and the bodies 29 of the rotary cutters and the arrangement of the roller bearings 30 is such that the lowermost roller bearings in the two sets are practically horizontally disposed so that the upward stresses of the lower portions of the rotary cutters during operation are received by the horizontally disposed roller bearings and transmitted to the bushings and from thence directly to the lower portion of the bit body, thus providing an extremely strong, substantial structure that results in long periods of service of the drill and its parts.

Further, the inclination of the bushings 22 and rotary cutters and the arrangement of the roller bearings 30 is such that the uppermost roller bearings in the two sets occupy practically vertical positions so as to counteract service strains and stresses that are developed by the upper portions of the cutting discs while the drill is in operation.

An important feature of my invention is, the formation of the drill body 10 in a single piece, for such construction greatly simplifies and cheapens the cost of construction as compared to a drill body that is formed in two or more pieces and further, the provision and arrangement of the thrust rings or bushings 22 and the construction of the upper portions of the discs 28 of the rotary cutters is such that said cutters may be easily and conveniently positioned upon the thrust rings or removed therefrom and thereby greatly facilitating assembly, inspection and replacement of worn or broken parts.

In many of the rotary drills now on the market it is necessary to form the drill body in two or more parts in order to permit the rotary cutters to be positioned in the inverted V-shaped notch in the lower end of the drill body, and this disadvantage is entirely overcome by my improved construction and arrangement of the thrust ring or bushing and the bodies of the rotary cutters that are mounted for rotation upon said thrust rings.

Thus it will been seen that I have provided a well drilling bit that is relatively simple in construction, inexpensive of manufacture, capable of being readily assembled or taken apart and which drilling bit is very effective in performing the functions for which it is intended.

It will be understood that minor changes in the size, form and construction of the various parts of my improved rotary well drilling bit may be made and substituted for those herein shown and described without departing from the spirit of my invention, the scope of which is set forth in the appended claims.

I claim as my invention:

1. In a rotary drill, a drill body, a pair of cutting discs mounted for rotation on the lower portion of said body, the axes of which cutting discs are correspondingly inclined in opposite directions relative to the axis of the drill body and also correspondingly inclined relative to a longitudinal plane that intersects the axis of the drill body and passes through the greatest width thereof, a series of teeth projecting outwardly from the periphery of each disc and downwardly below the plane of the lower face of said disc and a circular row of teeth depending from the underface of each disc, each of which last mentioned teeth is disposed in a plane parallel with the axis of the disc.

2. In a rotary drill, a drill body provided in its lower portion with an inverted V-shaped notch, the inclined faces of which notch are correspondingly inclined relative to a longitudinal plane that intersects the axis of the drill body and passes through the greatest width of said body, cutting discs mounted for rotation on said inclined faces, a series of teeth projecting outwardly from the periphery of each disc and downwardly below the plane of the lower face of said disc and a circular row of teeth depending from the underface of each disc which last mentioned teeth are disposed in planes parallel with the axis of the disc.

3. In a rotary drill, a drill body provided in its lower portion with an inverted V-shaped notch, the inclined faces of which notch are correspondingly inclined relative to a longitudinal plane that intersects the axis of the drill body and passes through the greatest width of said body, studs projecting from said inclined faces, a disc mounted for rotation on each stud, a series of teeth projecting outwardly from the periphery of each disc and downwardly below the plane of the lower face of said disc, a circular row of teeth depending from the underface of each disc inside and concentric with the peripheral teeth and the teeth in said circular row being disposed in planes parallel with the axis of the disc.

4. In a rotary drill, a drill body, a pair of oppositely disposed inclined cutting discs mounted for rotation on the lower portion of said drill body, a row of combined cutting and reaming teeth projecting outwardly and downwardly from the periphery of each disc and a separate concentric row of shearing teeth depending from the underface of each disc, which shearing teeth are tangentially disposed with respect to a circle of rotation of the disc.

5. In a rotary drill, a drill body, a pair of oppositely disposed inclined cutting discs mounted for rotation on the lower portion of said body, a row of combined cutting and reaming teeth projecting outwardly and downwardly from the periphery of each disc, a separate concentric row of shearing teeth depending from the underface of each disc with the greatest length of each shearing tooth disposed substantially parallel with the axis of the disc and the individual teeth of the two rows being tangentially disposed relative to a circle of rotation of the cutting disc.

6. In a rotary drill, a drill body, a pair of oppositely disposed discs arranged for rotation on inclined axes at the lower end of the drill body, a row of teeth projecting outwardly from the periphery of the disc and downwardly below the plane of the lower face of the disc, a concentric row of separate teeth depending from the underside of each disc and disposed within the row of peripheral teeth and the teeth in said concentric row being disposed in planes parallel with the axis of the disc and substantially wedge-shape in longitudinal section.

7. In a rotary drill, a drill body, a pair of oppositely disposed discs arranged for rotation on inclined axes at the lower end of the drill body, a row of teeth projecting outwardly from the periphery of the disc and downwardly below the plane of the lower face of the disc, a concentric row of separate teeth depending from the underside of each disc and disposed within the row of peripheral teeth, the teeth in said concentric row being disposed in planes parallel with the axis of the disc and substantially wedge-shape in longitudinal section and anti-friction bearings arranged between each disc and the body of the drill.

8. In a rotary drill, a drill body, a pair of oppositely disposed discs arranged for rotation on inclined axes at the lower end of the drill body, a row of teeth projecting outwardly from the periphery of the disc and downwardly below the plane of the lower face of the disc, a concentric row of separate teeth depending from the underside of each disc and disposed within the row of peripheral teeth and the teeth in said concentric row being wedge-shape in longitudinal section and gradually decreasing in width toward their forward ends.

9. In a rotary drill, a drill body, a pair of oppositely disposed discs arranged for rotation on inclined axes at the lower end of the drill body, a row of teeth projecting outwardly from the periphery of the disc and downwardly below the plane of the lower face of the disc, a concentric row of separate teeth depending from the underside of each disc and disposed within the row of peripheral teeth and which depending teeth are wedge-shape in longitudinal section and disposed so that their inclined inner faces are tangent to circular planes that are concentric with the axis and periphery of the disc.

10. In a rotary drill, a drill body, a pair of oppositely disposed cutting discs mounted for rotation on the lower portion of said body, two concentrically arranged rows of teeth formed on said body, the outer row of teeth projecting outwardly from the periphery of the disc and downwardly below the plane of the lower face of said disc, the teeth comprising the inner row being disposed in planes parallel with the axis of the disc and the teeth in the two rows occupying angular positions substantially 45° apart.

WILLIAM B. FLYNN.